United States Patent
Reed et al.

(10) Patent No.: US 7,562,208 B1
(45) Date of Patent: Jul. 14, 2009

(54) METHOD AND SYSTEM TO QUARANTINE SYSTEM SOFTWARE AND CONFIGURATION

(75) Inventors: John Marshal Reed, Morgan Hill, CA (US); R. Guy Lauterbach, Penn Valley, CA (US); Michael J. Tuciarone, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 1517 days.

(21) Appl. No.: 10/071,790

(22) Filed: Feb. 7, 2002

(51) Int. Cl.
*G06F 9/44* (2006.01)

(52) U.S. Cl. ................. 713/1; 713/2; 717/168; 717/169; 717/170; 717/171; 717/172; 717/173; 717/174; 717/175; 710/260

(58) Field of Classification Search ............ 713/1; 714/6, 36, 162
See application file for complete search history.

(56) References Cited

U.S. PATENT DOCUMENTS

| | | | |
|---|---|---|---|
| 5,568,641 A * | 10/1996 | Nelson et al. ............... 713/2 |
| 5,701,492 A * | 12/1997 | Wadsworth et al. ......... 717/173 |
| 5,819,292 A | 10/1998 | Hitz et al. |
| 5,963,962 A | 10/1999 | Hitz et al. |
| 6,038,570 A | 3/2000 | Hitz et al. |
| 6,275,931 B1 * | 8/2001 | Narayanaswamy et al. .... 713/2 |
| 6,308,265 B1 * | 10/2001 | Miller ......................... 713/2 |
| 6,459,624 B1 * | 10/2002 | Kuo ..................... 365/185.33 |
| 6,629,259 B2 * | 9/2003 | Lee ............................. 714/2 |
| 6,651,188 B2 * | 11/2003 | Harding et al. ............. 714/38 |
| 6,715,106 B1 * | 3/2004 | Mermelstein ............... 714/36 |
| 6,757,838 B1 * | 6/2004 | Chaiken et al. .............. 714/5 |
| 6,792,556 B1 * | 9/2004 | Dennis ........................ 714/6 |
| 6,981,136 B2 * | 12/2005 | Fuse et al. ................... 713/2 |
| 7,206,970 B1 | 4/2007 | Lauterbach et al. |

OTHER PUBLICATIONS

David Hitz et al. TR3002 File System Design for a NFS File Server Appliance published by Network Appliance, Inc.

* cited by examiner

*Primary Examiner*—A. Elamin
(74) *Attorney, Agent, or Firm*—Cesari and McKenna, LLP (57) ABSTRACT

The present invention provides a system and method to quarantine in the storage operating system and configuration information in which the storage operating system is stored in a designated partition on a removable nonvolatile memory device, such as a compact flash or a personal computer (PC) card that is interfaced with a motherboard of a filer system server. By providing for separate partitions, a failure or error arising during an upgrade to the storage operating system will not corrupt the other partitions.

14 Claims, 5 Drawing Sheets

METHOD AND SYSTEM TO QUARANTINE SYSTEM SOFTWARE AND CONFIGURATION

RELATED APPLICATION

This application is related to U.S. patent application Ser. No. 10/072,140 now issued as U.S. Pat. No. 7,206,970, entitled SYSTEM AND METHOD FOR DIAGNOSTICS EXECUTION AND DATA IN A STORAGE SYSTEM USING NON-VOLATILE MEMORY by R. Guy Lauterbach et al, the teachings of which are expressly incorporated herein by reference.

FIELD OF INVENTION

The present invention relates to networked storage systems and, more particularly, to data storage systems including file servers and kernel boot mechanisms for such systems.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored. A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system, residing on the filer, that processes file-service requests from network-attached clients.

As used herein, the term "storage operating system" generally refers to the computer-executable code operable on a storage system that implements file system semantics and manages data access. In this sense, Data ONTAP software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity) partitions in a single disk) arranged according to a RAID 4, or equivalent high-reliability, implementation.

Internally, the filer is a microprocessor-based computer in which one more microprocessors are interconnected by a system bus to various system components that may be physically located on a motherboard and which include a memory, having a buffer cache for storing data and commands, a network adapter for communicating over the LAN or another network, a firmware storage device such as an erasable programmable read only memory (EPROM—which may comprise a flash memory, that retains power during shutdown), that contains system firmware (including a boot mechanism), and various storage adapters for communicating with the storage volumes of the disk array attached to the filer.

New releases of the storage operating system may be issued for a variety of reasons, including, but not limited to correction of problems and addition of new features. In one known distribution method, the storage operating system is released on physical media, such as floppy disks. In another, the administrator may download the new version of the storage operating system from the producer's website over, for example, the well-known Internet. Each of these distribution methodologies has noted disadvantages. As the size of the storage operating system, or kernel, increases, the number of physical disks required to distribute the kernel also increases. Managing a set of, for example, ten floppy disks which contains the new version of the storage operating system can be cumbersome for system administrators.

A disadvantage shared by both the removable storage media and Internet-based distribution schemes is the possibility of corruption of the storage operating system during the installation process. For example, a power loss during the installation process could corrupt the storage operating system, thereby leaving the filer inoperative. In some implementations, the kernel or storage operating system may be contained on an EPROM or similar chip on the motherboard of the file server. However, these implementations have a noted disadvantage in that the storage capacity of these on-board chips is often too small to hold an entire copy of the storage operating system or kernel. Additionally, if an error or loss of power occurs during an upgrade process to an EPROM, the possibility of corruption of the kernel exists. Thus, it is desirable to quarantine the kernel or storage operating system during the upgrade process so that the kernel cannot be corrupted due to errors or power failures during the upgrade process.

Additionally, changes in the system configuration as a result of activating features to acquire additional functionality, such as enabling drivers or additional central processing units for multi-processing operation, can result in a non-operational system configuration. These non-operational system configurations can result from users adjusting or modifying a file server system configuration. Thus, it is desirable to quarantine a known configuration that is operational while the user or administrator modifies configuration variables.

SUMMARY OF THE INVENTION

The disadvantages of the prior art are overcome by providing a method and system to delineate the storage operating system software and configuration information through the use of a partitionable removable nonvolatile memory device, such as a compact flash or PC card as the mechanism for storing and distributing copies of the storage operating system or kernel.

According to an illustrative embodiment, the removable nonvolatile memory device is a relatively large-capacity, separate memory component that interfaces with, but is not an integral part of, the motherboard and is physically connected to the motherboard via an interface device. The removable nonvolatile memory device appears to the processor as a generalized discrete storage device. A port for this type of connection can be built into a motherboard, and as such, the removable nonvolatile memory device can be readily coupled to a third party-manufactured motherboard. The various partitions of the removable nonvolatile memory device are able to hold differentiated data such as a kernel and diagnostics software.

When the kernel is to be rewritten, upgraded, or patched for configuration changes occur, this can be readily accomplished via an I/O operation performed directly with a removable nonvolatile memory device. Internally, the removable nonvolatile memory device is divided into several memory partitions, each of which appears to the filer's storage operating system as a separate "drive." The removable nonvolatile memory device is readily partitionable, unlike typical on-board EPROM. In accordance with an embodiment of this invention, when the kernel is to be upgraded, the boot kernel, i.e. the kernel that was most recently booted from, is copied into a last known good kernel partition on the removable nonvolatile memory device. A boot variable is then set by the firmware of the file server to make this last known good kernel partition be bootable. This ensures that should an error or loss of power occur during the remainder of the upgrade process, the filer will be able to boot.

The upgrade kernel is then copied into the first partition of the removable nonvolatile memory device. After the copy is verified, the boot variables are then changed to make this first partition bootable. Once the filer reboots, the new upgraded kernel will be loaded and executed. If an error occurs and the new kernel does not boot properly, the firmware will then boot from the last known good kernel location.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

I. Storage System Environment

Figure 1:
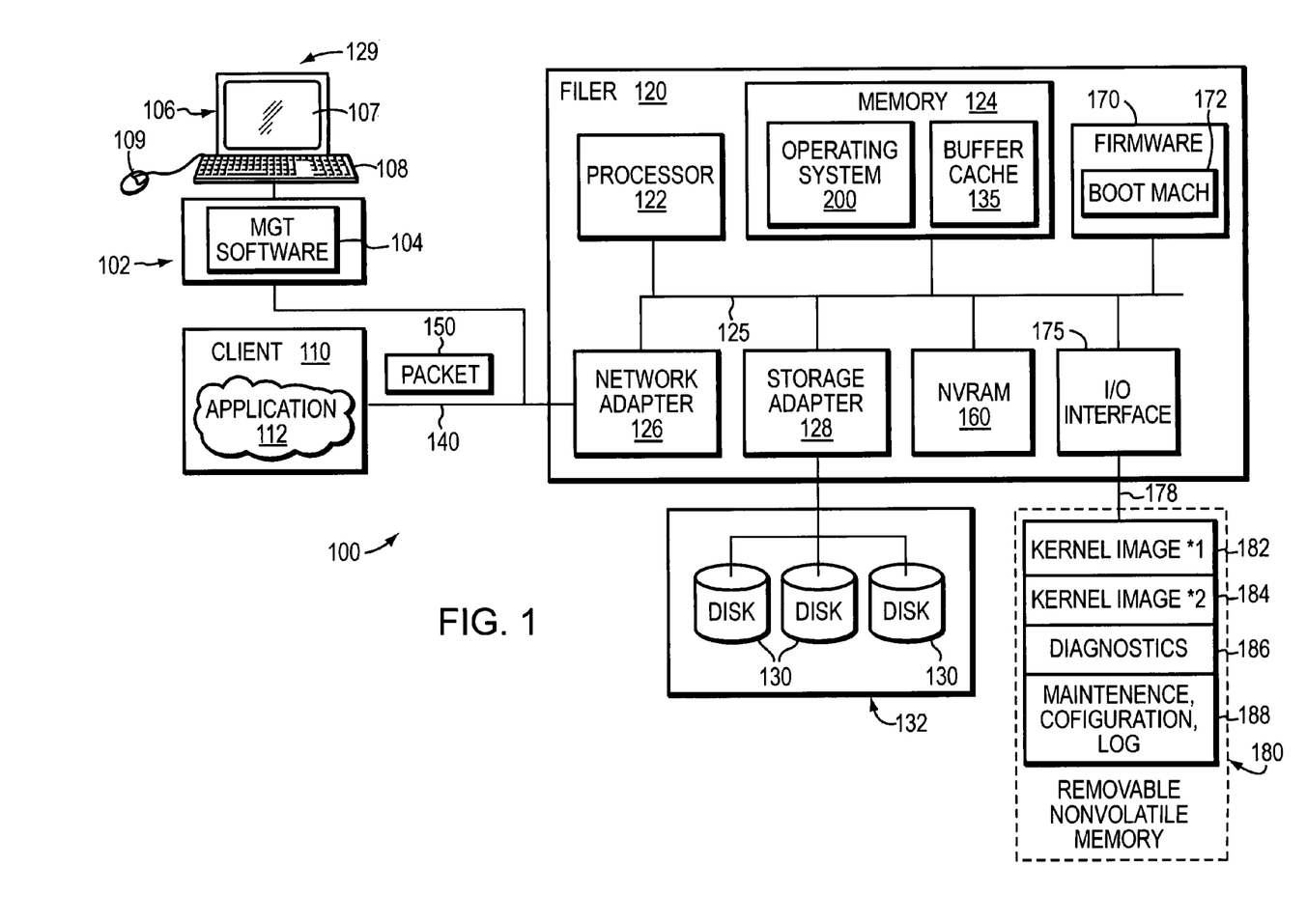
FIG. 1 is a schematic block diagram of a networked storage system embodying the present invention.

By way of further background, FIG. 1 is a schematic block diagram of a storage system environment 100 that includes a client 110 having one or more applications 112, and an interconnected file server 120 that may be advantageously used with the present invention. The filer server or "filer" 120 is a computer that provides file service relating to the organization of information on storage devices, such as disks 130. It will be understood to those skilled in the art that the inventive technique described herein may apply to any type of special-purpose computer (e.g., server) or general-purpose computer, including a standalone computer. The filer 120 comprises a processor 122, a memory 124, a network adapter 126 and a storage adapter 128 interconnected by a system bus 125. The filer 120 also includes a storage operating system 200 that implements a file system to logically organize the information as a hierarchical structure of directories and files on the disks. A console or other user interface 129 is provided to control various filer functions, including those implemented according to this invention, and report on the status of filer operations.

It will be understood to those skilled in the art that the inventive technique described herein may apply to any type of special-purpose computer (e.g., file serving appliance) or general-purpose computer, including a standalone computer, embodied as a storage system. To that end, filer 120 can be broadly, and alternatively, referred to as storage system. Moreover, the teachings of this invention can be adapted to a variety of storage system architectures including, but not limited to, a network-attached storage environment, a storage area network and disk assembly directly-attached to a client/host computer. Additionally, the teachings of this invention can also be used for upgrading kernel and configuration information of a variety of networking devices, including network caching devices, such as proxy cache servers. The term "storage system" should, therefore, be taken broadly to include such arrangements.

In the illustrative embodiment, the memory 124 comprises storage locations that are addressable by the processor and adapters for storing software program code. A portion of the memory may be further organized as a "buffer cache" 135 for storing data structures that are passed between disks and the network during normal runtime operation. The memory comprises a form of random access memory (RAM) that is generally cleared by a power cycle or other reboot operation (e.g. it is a "volatile" memory). The processor and adapters may, in turn, comprise processing elements and/or logic circuitry configured to execute the software code and manipulate the data structures. The operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the filer 120 to a client 110 over a computer network 140, which may comprise a point-to-point connection or a shared medium, such as a local area network. The client 110 may be a general-purpose computer configured to execute applications 112, such as a database application. Moreover, the client 110 may interact with the filer 120 in accordance with a client/server model of information delivery. That is, the client may request the services of the filer, and the filer may return the results of the services requested by the client, by exchanging packets 150 encapsulating, e.g., the CIFS protocol or NFS protocol format over the network 140.

The storage adapter 128 cooperates with the operating system 200 executing on the filer to access information requested by the client. The information may be stored on the disks 130 of a disk array that is attached, via the storage adapter 128 to the filer 120 or other node of a storage system as defined herein. The storage adapter 128 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

In one exemplary filer implementation, the filer 120 can include a nonvolatile random access memory (NVRAM) 160 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

As will be described in detail below, the Filer 120 also provides a I/O interface 175 connected to a removable non-volatile memory device according to an illustrative embodiment of this invention. In an illustrative embodiment, the I/O interface can be a southbridge device, which is well-known in the art.

Connected to the LAN 140 may be a station using which a maintenance operator can interface with the system. A management station 102 can include a server or PC-based computer in a console 129 with a network interface for communicating over the LAN 140. Within the management station 102, resides appropriate management software 104. A graphical user interface (GUI) 106 may include a display 107, a keyboard 108 and a mouse 109 so that a maintenance operator can enter commands into the system.

In an illustrative embodiment, the disk array 132 is arranged as a plurality of separate volumes each having a file system associated therewith, as described further. The volumes each include one or more RAID groups of disks 130. In one embodiment, the RAID groups can each include independent physical disks 130 including those storing striped data and those storing separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

II. Storage Operating System

To facilitate generalized access to the disks 130 on the array 132, the storage operating system 200 (FIG. 2) implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. As noted above, in the illustrative embodiment described herein, the operating system is the NetApp® Data ONTAP™ operating system available from Network Appliance, Inc., that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Again to summarize, as used herein, the term "storage operating system" generally refers to the computer-executable code operable on a storage system that implements file system semantics (such as the above-referenced WAFL) and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 2:
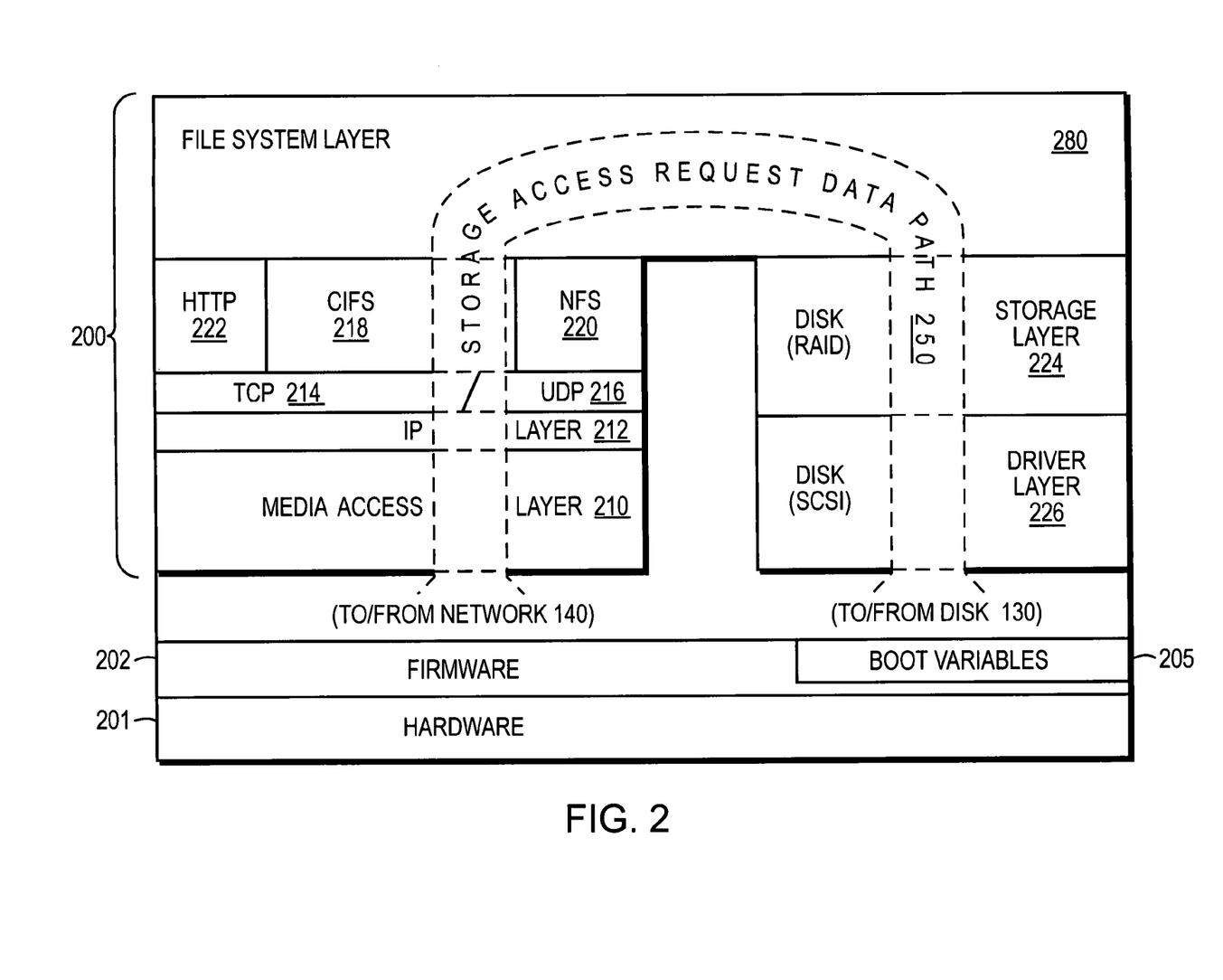
FIG. 2 is a schematic illustration of the interconnection between the hardware, firmware and the storage operating system of a filer in accordance with the present invention.

The organization of the preferred storage operating system for the exemplary filer is now described briefly. However, it is expressly contemplated that the principles of this invention can be implemented using a variety of alternate storage operating system architectures. As shown in FIG. 2, the storage operating system 200 comprises a series of software layers, including a media access layer 210 of network drivers (e.g., an Ethernet driver). The operating system further includes network protocol layers, such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes support for the CIFS protocol 218, the NFS protocol 220 and the Hypertext Transfer Protocol (HTTP) protocol 222. In addition, the storage operating system 200 includes a disk storage layer 224 that implements a disk storage protocol, such as a RAID protocol, and a disk driver layer 226 that implements a disk access protocol such as, e.g., a Small Computer Systems Interface (SCSI) protocol.

Bridging the disk software layers with the network and file system protocol layers is a file system layer 280 of the storage operating system 200. Generally, the layer 280 implements a file system having an on-disk format representation that is block-based using, e.g., 4-*kilobyte* (KB) data blocks and using inodes to describe the files. In response to transaction requests, the file system generates operations to load (retrieve) the requested data from volumes 134 if it is not resident "in-core", i.e., in the filer's memory 124. If the information is not in memory, the file system layer 280 indexes into the inode file using the inode number to access an appropriate entry and retrieve a logical volume block number. The file system layer 280 then passes the logical volume block number to the disk storage (RAID) layer 224, which maps that logical number to a disk block number and sends the latter to an appropriate driver (for example, an encapsulation of SCSI implemented on a fibre channel disk interconnection) of the disk driver layer 226. The disk driver accesses the disk block number from volumes 134 and loads the requested data in memory 124 for processing by the filer 120. Upon completion of the request, the filer (and storage operating system) returns a reply, e.g., a conventional acknowledgement packet defined by the Common Internet File System CIFS specification, to the client 110 over the network 140.

It should be noted that the software "path" 250 through the storage operating system layers described above needed to perform data storage access for the client request received at the filer may alternatively be implemented in hardware or a combination of hardware and software. That is, in an alternate embodiment of the invention, the storage access request data path 250 may be implemented as logic circuitry embodied within a field programmable gate array (FPGA) or an application specific integrated circuit (ASIC). This type of hardware implementation increases the performance of the file service provided by filer 120 in response to a file system request packet 150 issued by client 110.

The firmware 202 is shown in connection with the storage operating system 200 residing beneath the disk layer (FIG. 2). The firmware 202 thus interacts with the disks and operating system in a manner to be described further below. A firmware storage device 170 (FIG. 1) is operatively interconnected with the filer's (120) components. The firmware 202 residing in the firmware storage device 170 includes a basic instruction set stored on a nonvolatile memory, such as a flash memory, and includes a boot mechanism 172. The firmware also includes a set of boot variables 205. The boot variables 205 identify the device or devices that are to be booted from during initialization of the file server. The boot variables can take many forms, including, for example a boot path containing an ordered list of devices from which to boot.

For purposes hereof, the term "boot mechanism" shall in general include any mechanism, whether implemented in hardware, firmware, software or a combination thereof, for controlling boot-up and reinitialization of a file server. Also, while the firmware is stored in a nonvolatile memory component, it is expressly contemplated that it can reside in a variety of other filer-accessible locations and in a variety of forms (such as a backup hard drive, optical storage, magnetic tape, etc.)

A bus interface (not shown) allows the firmware to communicate over the system bus 125. This bus interface can be based on a variety of protocols, such as a Peripheral Component Interface (PCI) standard or Integrated Device Electronics (IDE) standard. Notably, the firmware provides the most-basic instruction set to start a cold (uninitialized and/or powered-down) system, and to perform the final steps in bringing-down the system when a more-comprehensive instruction set (in the form of a storage operating system kernel) is not present.

In accordance with the invention, an I/O interface 175 is connected to the system bus 125 of the motherboard of the filer 120. An ISA bus 178 couples a removable nonvolatile memory device 180 to the system I/O interface 175. As used herein, the term "removable nonvolatile memory device," broadly stated, shall include a large capacity memory device (typically 4-8 MB or more memory storage capacity, and up to about 128 MB, or more) with a storage capacity that is high when compared to a typical firmware storage medium (which is often 512 KB of storage memory), and this removable nonvolatile memory device should be readily partitionable into separate memory segments that may represent separate drives (e.g., that may have associated drive letters such as E:, F: and G:, etc.), and as such, accessing one "drive letter" does not directly impact data storage on other drive letters/partitions. According to this definition, the removable nonvolatile memory device may be readily removable without loss of stored information. However, actual ease of removability may be limited due to filer construction architecture and the like. In addition, conventional controllers can be employed to operate the partitioned drives as IDE-based components and to provide error checking and recovery.

In accordance with one aspect of the invention, the removable nonvolatile memory device is a compact flash 180. The compact flash 180 appears as an IDE drive device to the firmware 202 when the filer 120 powers-on. As noted earlier, other types of removable nonvolatile memory devices may also be employed, but in the interest of brevity, we refer to the compact flash 180 in this description of an illustrative embodiment.

The compact flash 180 is divided into a number of logical memory partitions. In the illustrative embodiment, the compact flash 180 has four partitions each of which can store differentiated data. The exact number of partitions can vary based upon the applications required thereon. In one example, one partition contains a kernel image, while another contains other forms of software (i.e. diagnostics) or data storage. These four partitions may be referred to as the C:, D:, E:, and F: drives of the filer. As the removable nonvolatile memory device appears to the storage operating system as a regular drive, traditional partitioning utilities can be utilized to generate and maintain the partitions.

In the illustrative embodiment, the first partition 182 contains the kernel image of the storage operating system being used in the particular application and the current configuration information. This configuration information includes the various hardware, software, and/or firmware settings describing the optional features that can be activated to provide additional functionality to the filer. These configuration settings, which may be user adjustable, include such features as activation of, inter alia, multiprocessor support. As used herein, the term kernel should be taken to include any configuration information. The second partition 184 includes a backup copy of the kernel image and a backup of the last known good configuration. The third partition 186 includes diagnostics code and the fourth partition 188 is designed for storing diagnostics log file. Details regarding the use of diagnostics code and log files on a removable nonvolatile memory device are set forth in the above-incorporated U.S. patent application Ser. No. 10/072,140 now issued as U.S. Pat. No. 7,206,970, entitled SYSTEM AND METHOD FOR DIAGNOSITCS EXECUTION AND DATA IN A STORAGE SYSTEM USING NONVOLATILE MEMORY by R. Guy Lauterbach et al.

As the removable nonvolatile memory device appears as a physical disk drive to the storage operating system, traditional partitioning tools can be used to create the partitions on the device. In one embodiment of the invention, a 32-megabyte (MB) PC card may be employed. However, there are a number of available compact flash devices and PC card sizes, and the appropriate device size for a particular application may be selected. Other types of removable nonvolatile memory storage devices can also be employed to store the diagnostics image if desired in a particular application, such as magnetic memory units and optical memory units.

The removable nonvolatile memory device allows replacement of the component without compromising storage operating system or filer data integrity. The component may be quickly and easily removable if is determined by an appropriate operator that replacement is desired. But, the use of a compact flash or PC card allows for ready updates or rewriting of code without the necessity of writing to the boot flash, which is undesirable. It is also provides a built-in disaster recovery mechanism in that in the event of a power loss, the compact flash or other removable nonvolatile memory device retains its contents, even upon power-off. This cannot always occur when using a floppy disk or a CD-ROM, and/or with out involving the on-board flash.

The kernel image 182 that is resident on the compact flash 180 constitutes the operating system 200 that is loaded into the memory 124. However, it is also contemplated that more than one compact flash component or PC card may be employed in certain instances. For example, the operating system kernel or back up copy may be stored on one component, and the diagnostics on another, while remaining within the scope of the present invention.

C. Kernel Images and Booting

In an illustrative embodiment, the first two partitions of the removable nonvolatile memory device 182 and 184 are designated to hold kernel images and configuration information. The firmware (202 in FIG. 2) includes instructions for booting from the removable nonvolatile memory device and for activating various capabilities defined by the configuration information.

Figure 3:
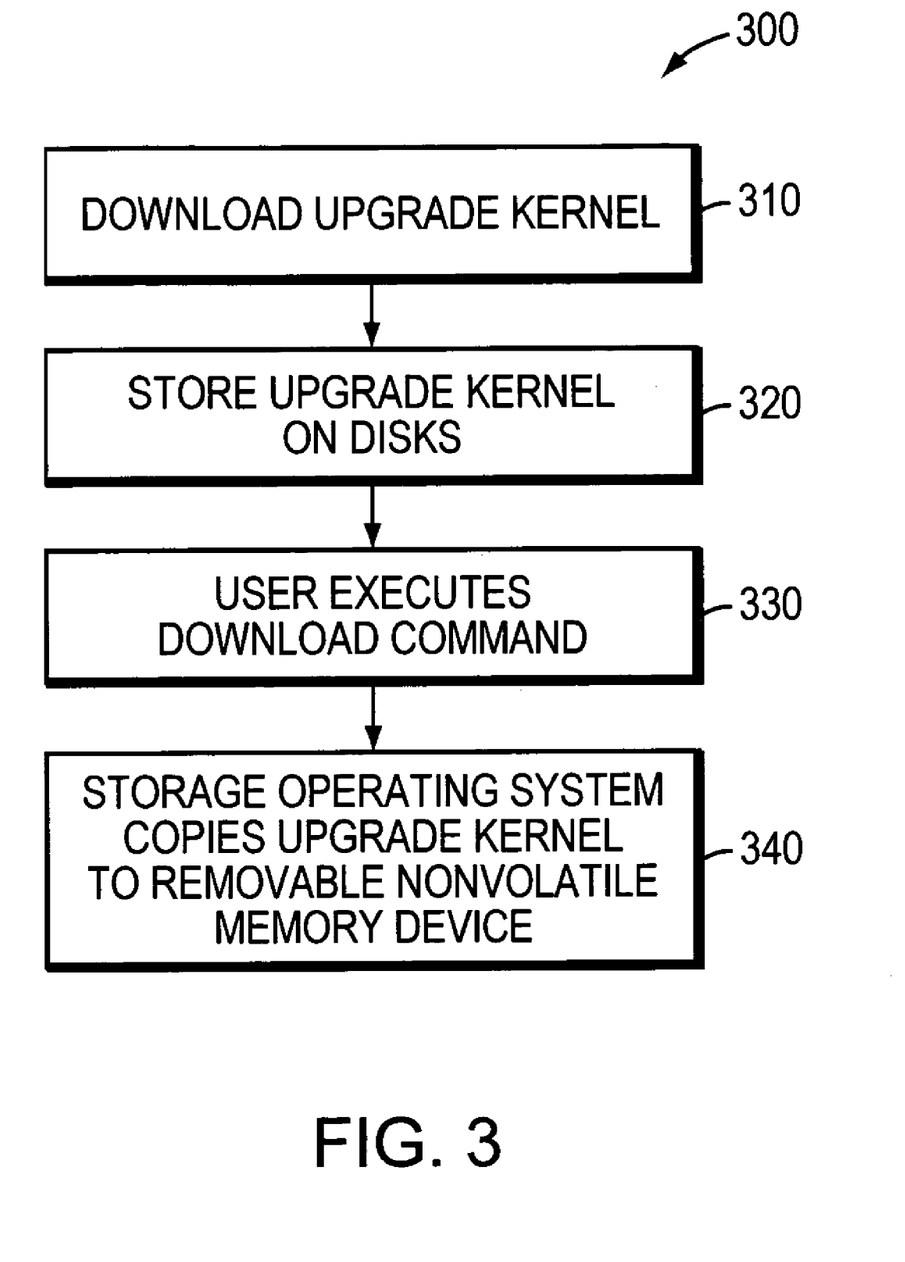
FIG. 3 is a flowchart of a procedure for upgrading a kernel in accordance with an embodiment of this invention.

FIG. 3 is a flowchart of the steps involved in upgrading or otherwise replacing a kernel in accordance with this invention. First, in step 310, the user or administrator downloads or otherwise acquires a copy of the upgrade kernel. For example, the administrator may obtain a copy of the upgrade kernel on physical magnetic or optical media, such as floppy disks or compact disk-read only memory (CR-ROM). By upgrade kernel it is meant any kernel or configuration information that in any way modifies or is different from the existing kernel or configuration information used by the filer. This includes, but is not limited to modifications, updates, repairs, restorations and replacements made to the existing kernel and configuration information. This upgrade kernel is then stored on one or more disks that are accessible to the storage operating system (step 320). The user must execute a command, arbitrarily called DOWNLOAD (step 330), which causes the file server to copy the upgrade kernel to the removable nonvolatile memory device in accordance with this invention (step 340).

Figure 4:
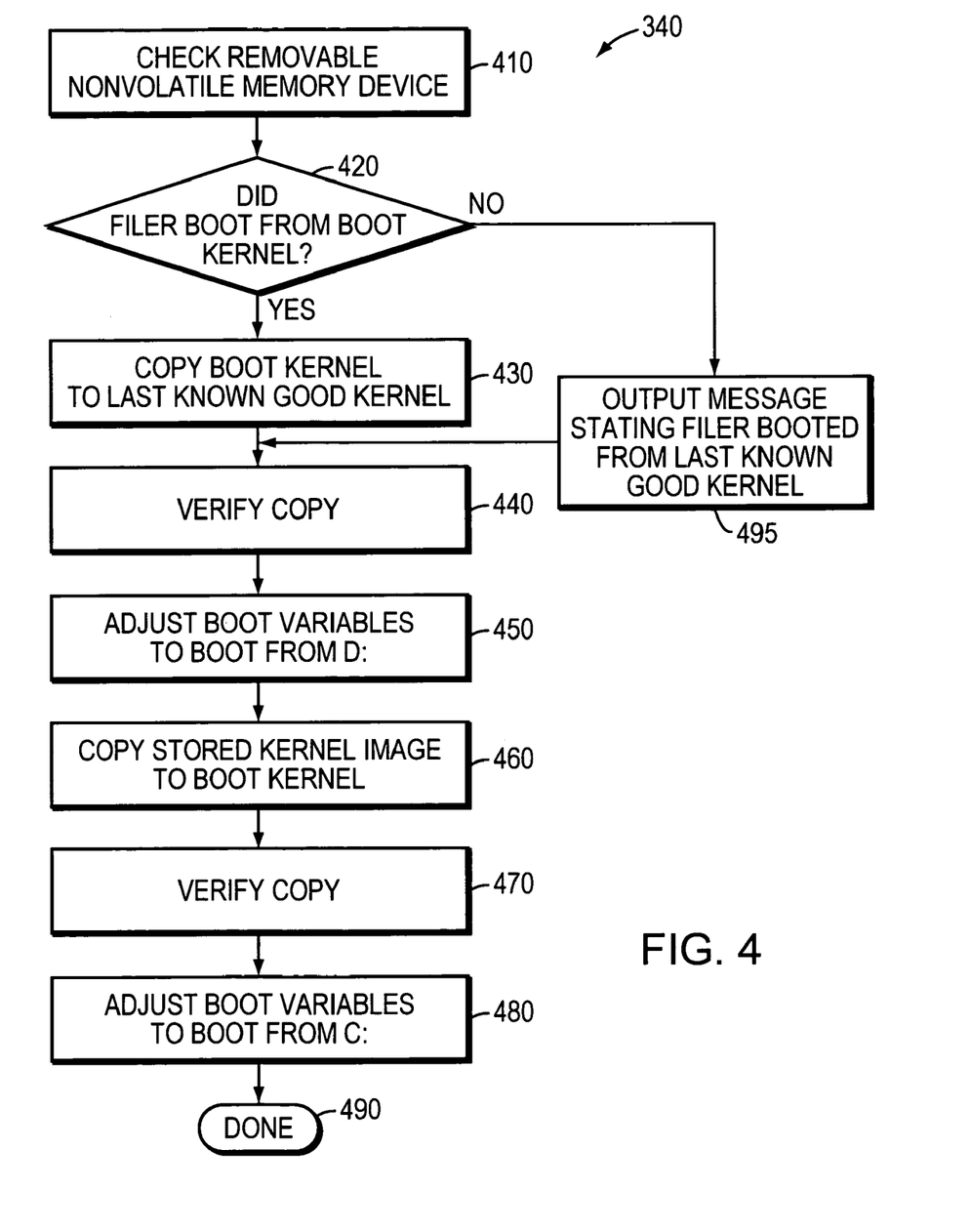
FIG. 4 is a flowchart of a procedure for copying the upgrade kernel to the removable nonvolatile memory device in accordance with the steps of FIG. 3.

FIG. 4 is a flowchart detailing the steps of copying the upgrade kernel to the removable nonvolatile memory device in accordance with step 340 of FIG. 3. First, in step 410, the removable nonvolatile memory device is checked. Next, in step 420, a determination is made as to whether the filer booted from the boot kernel or not. This determination may be made by, for example, checking the boot variables 205 in the firmware, or by checking other variables (not shown) maintained by the storage operating system. If the filer booted from the boot kernel, the boot kernel is then copied to the last known good kernel location (step 430). In the illustrative embodiment, this last known good kernel location is the second partition 184 of the removable nonvolatile memory device. This copy is then verified in step 440. This verification can take many forms, including, for example, a bit by bit comparison of the source and destination copies of the kernel image.

The boot variables 205 are next adjusted so that the filer will boot from the arbitrarily named D: drive (step 450). This D: drive refers to the last know good kernel location partition of the removable nonvolatile memory device. At this point, should an error condition occur, or the filer lose power, the file server will utilize the good kernel stored in the second partition 184 to boot from.

The stored upgrade kernel is then copied from the disks to the boot kernel location, which in this exemplary illustration is the first partition 182 of the removable nonvolatile memory device. (step 460). This copy is then verified in step 470. The boot variables 205 are then set, in step 480, so that the filer will boot from the C: drive, which corresponds to the first partition 182 where the upgrade kernel was just copied. After the boot variables are updated, the procedure is complete (step 490).

If the filer was not booted from the boot kernel, a message is outputted to the user alerting the user that the filer was booted from a last known good kernel (step 495). After this message is sent, the procedure moves to step 450 and continues from there.

This installation process thus ensures that if an error situation occurs in the middle of the installation, the file server will be able to successfully reboot to a known, good kernel and configuration. The use of a last known good kernel and configuration information and the modifying of the boot variables works to prevent a filer from having an error during the process of installing an upgrade kernel and resulting in a nonfunctional boot kernel. In one embodiment of the invention, the boot variables 205 define a boot path of an ordered list of devices and partitions to boot from. In such an embodiment a typical boot path might be "C:;D:;" which signifies that the firmware should first attempt to boot from the C: drive (the first partition 182). If that boot is not successful, the firmware should then attempt to boot from the D: drive (the second partition 184). The use of such a boot path prevents a filer from not booting if, for example, an upgrade kernel installed to the first partition does not function properly or the configuration information stored in the first partition does not result in an operational filer. In such an event, the firmware would then boot from the last known good kernel location.

Figure 5:
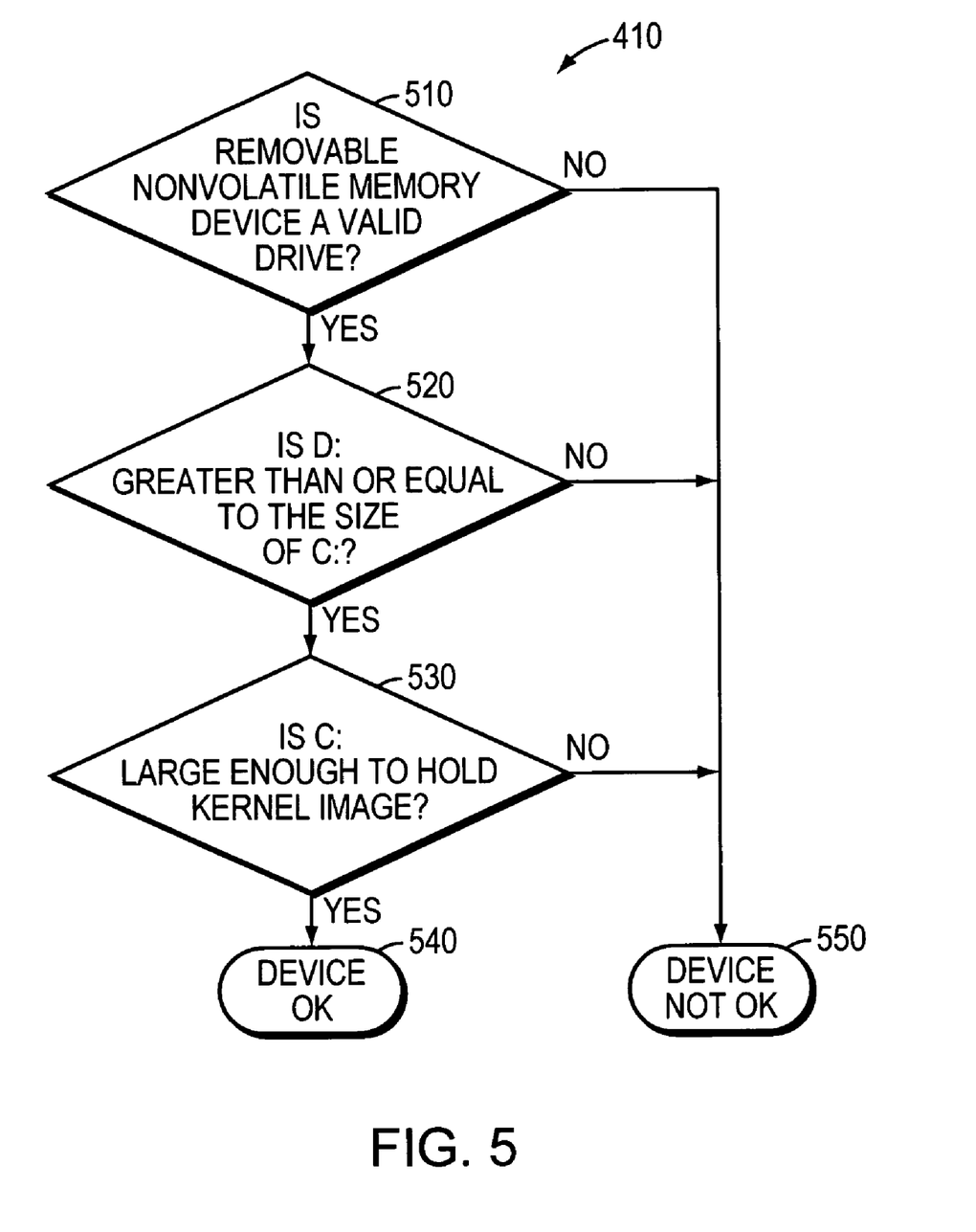
FIG. 5 is a flowchart of the procedure of checking a removable nonvolatile memory device in accordance with the steps of FIG. 4.

FIG. 5 is a flowchart of the procedure of checking a removable nonvolatile memory device in accordance with step 410 of FIG. 4. In step 510, the storage operating system determines if the removable nonvolatile memory device is a valid device for the filer. Next, in step 520, the size of the D: drive (the second partition in the illustrative embodiment) is checked against the size of the C: drive (the first partition) to ensure that the D: drive is greater than or equal to the size of C:. Then, in step 530, the C: drive is checked to ensure that it is large enough to hold the kernel image. If it is, the removable nonvolatile memory device passes the tests (step 540). If the device fails any of the tests, the device is not acceptable for use with the kernel installation procedure described above (step 550). It should be noted that these tests are exemplary only, and can be performed in any order. Additional tests can also be performed of the removable nonvolatile memory device while still remaining within the scope of the teachings herein.

The foregoing has been a detailed description of an illustrative embodiment of the invention. Various modifications and additions can be made without departing from the spirit and scope of the invention. For example, it should be understood that the partitioning of the removable nonvolatile memory device, or the command line interfacing could be altered and adapted for various applications while remaining within the scope of the present invention. Additionally, while this description has been written in reference to filers and file servers, the principles are equally pertinent to all types of computers. It is expressly noted that network caching devices, such as proxy cache servers operatively interconnected with servers, clients and other networking devices can be utilized with the present invention. It should also be noted that references have been made to a C: and D: drive and a first and second partition only for illustrative purposes. The principles and teachings of this invention are applicable to any partitions of a removable nonvolatile memory device. Further, it is expressly contemplated that the teachings of this invention can be implemented as software, including a computer-readable medium having program instructions executing on a computer, hardware, firmware, or a combination thereof. Accordingly, this description is meant to be taken only by way of example and not to otherwise limit the scope of the invention.

What is claimed is:

1. A removable nonvolatile memory device for use in a storage system having an operating system kernel, comprising:
    a plurality of partitions, each of the plurality of partitions capable of storing differentiated information;
    a first kernel image, the first kernel image stored in a first partition of the plurality of partitions wherein the first kernel image is an upgrade kernel;
    a second kernel image, the second kernel image stored in a second partition of the plurality of partitions, wherein the second kernel image is a last known good kernel; and
    a set of diagnostic software, the diagnostic software stored in a third partition of the plurality of partitions.

2. The removable nonvolatile memory device of claim 1, wherein the storage system further comprises a set of boot instructions including instructions for booting from the first kernel image.

3. The removable nonvolatile memory device of claim 2, wherein the set of boot instructions further comprises instructions for booting from the second kernel image if an error event occurs during booting from the first kernel image.

4. The removable nonvolatile memory device of claim 1, further comprising a diagnostic log, the diagnostic log stored in a fourth partition of the plurality of partitions.

5. A storage system for a computer having a processor, a memory coupled to the processor, and a system bus to which the memory and processor are coupled, the computer having an operating system kernel and being configured to implement a file system, the storage system comprising:
    a removable nonvolatile memory device coupled to the system bus, the removable nonvolatile memory device having a plurality of partitions, wherein a first partition of the plurality of partitions containing a kernel image, wherein the first kernel image is an upgrade kernel;
    a set of boot instructions resident in the storage system including instructions for booting from a first set partition of the removable nonvolatile memory device and instructions for booting from an alternate set partition of the removable nonvolatile memory device if an error event occurs during booting from the first set partition, wherein the removable nonvolatile memory device further comprises a second partition of the plurality of partitions, the second partition containing a last known good kernel image; and
    a third partition of the plurality of partitions, the third partition containing diagnostic software.

6. The storage system of claim 5 wherein the removable nonvolatile memory device is a compact flash.

7. The storage system of claim 5, wherein the set of boot instructions are contained in firmware within the storage system.

8. The storage system of claim 7 further comprising a fourth partition of the plurality of partitions, the fourth partition containing a diagnostic log.

9. A method for installing a new kernel image to a removable nonvolatile memory device having a plurality of partitions in a storage system comprising the steps of:
    storing the new kernel image on a storage device;
    copying a current boot kernel from a first partition of the removable nonvolatile memory device to a second partition of the removable nonvolatile memory device;
    copying the new kernel image to the first partition of the removable nonvolatile memory device; and
    providing a diagnostic software on a third partition of the removable nonvolatile memory device.

10. The method of claim 9, wherein the storage device further comprises one or more storage disks operatively interconnected to the storage system.

11. A method for installing an upgrade kernel in a computer system having a removable nonvolatile memory device, the removable nonvolatile memory device having at least a first partition, a second partition and a third partition, the computer system currently executing a copy of an old kernel stored in the first partition of the removable non-volatile memory device, the method comprising the steps of:
    determining if the computer system booted from the old kernel, and if so, copying the old kernel from the first partition to make a copy of the old kernel to place in the second partition;
    adjusting a set of boot variables so that the computer will boot from the second partition;
    copying a stored copy of the upgrade kernel to the first partition; and
    adjusting the set of boot variables so that the computer will boot from the first partition; and
    accessing diagnostic software stored on the third partition of the removable nonvolatile memory device.

12. The method of claim 11 further comprising the step of:
    verifying the copy of the old kernel written to the second partition before adjusting the set of boot variables so that the computer will boot from the second partition.

13. A method for installing an upgrade kernel in a computer system having a removable nonvolatile memory device, the removable nonvolatile memory device having at least a first partition, a second partition and a third partition, the computer system currently executing a copy of an old kernel stored in the second partition of the removable nonvolatile memory device, the method comprising the steps of:
  outputting a message to a user alerting the user that the computer booted from a last known good kernel;
  adjusting a set of boot variables so that the computer will boot from the second partition;
  copying a stored copy of the upgrade kernel to the first partition; and
  adjusting the set of boot variables so that the computer will boot from the first partition; and accessing diagnostic software stored on the third partition of the removable nonvolatile memory device.

14. The method of claim 12 further comprising the step of:
  verifying the copy of the upgrade kernel to the first partition before adjusting the set of boot variables so that the computer will boot from the first partition.

* * * * *